United States Patent [19]

Pellenc

[11] 4,323,269
[45] Apr. 6, 1982

[54] COAXIAL COUPLING SYSTEM

[75] Inventor: Roger Pellenc, Pertuis, France

[73] Assignee: Etablissements Pellenc & Motte, Pertuis, France

[21] Appl. No.: 18,038

[22] Filed: Mar. 6, 1979

[30] Foreign Application Priority Data

Mar. 9, 1978 [FR] France .............................. 78 07383

[51] Int. Cl.³ ........................................... F16L 39/00
[52] U.S. Cl. ................................. 285/133 R; 285/190;
285/238; 285/276; 285/305; 285/321
[58] Field of Search ................... 285/134, 136, 133 R,
285/138, 190, 321, 305, 276, 238; 137/580

[56] References Cited

U.S. PATENT DOCUMENTS

| 1,665,655 | 4/1928 | Clisson | 285/136 |
| 2,418,653 | 4/1947 | McCormack | 285/134 X |
| 2,838,074 | 6/1958 | Louck | 285/133 R |
| 2,983,506 | 5/1961 | Bertsch et al. | 285/133 R X |
| 3,314,696 | 4/1967 | Ferguson et al. | 285/321 X |
| 3,841,671 | 10/1974 | Walker | 285/133 R |
| 3,986,732 | 10/1976 | Stanley | 285/190 X |
| 4,054,306 | 10/1977 | Sadoff | 285/305 X |
| 4,090,539 | 5/1978 | Krupp | 285/134 |
| 4,109,381 | 8/1978 | Pellenc | 30/228 |
| 4,133,564 | 1/1979 | Sarson | 285/321 |

FOREIGN PATENT DOCUMENTS 1120657 4/1956 France .
643723 9/1950 United Kingdom ................ 285/134

Primary Examiner—Dave W. Arola
Attorney, Agent, or Firm—Sandler & Greenblum

[57] ABSTRACT

The invention relates to a coupling system for coaxial hoses adapted to feed fluid into hydraulic machines and apparatus and to provide an exit for same, such a system ensuring conveniently and speedily under good operative conditions, a disconnectable fitting of the ends of the input and output pipes respectively on a body such as a union connected in its turn with a supply of a compressed fluid, and with a handtool such as hydraulic shears or pruning-scissors or else a machine-tool such as an air-hammer or a hydraulic machine, to be used on the yard.

19 Claims, 4 Drawing Figures

COAXIAL COUPLING SYSTEM

BACKGROUND OF THE INVENTION

The improved coupling system may, generally speaking, serve for connecting coaxial hoses respectively with a union connected in its turn with the input and output channels, and with a machine or apparatus operated by a flow of fluid under pressure between a high pressure fluid input and a low pressure fluid output.

In the U.S. Pat. No. 4,109,381 in the name of the present applicant, there are described and claimed hydraulic pruning-scissors connected with the supply of operative fluid through coaxial hoses of which the inner pipe feeds the hydraulic fluid under pressure into the pruning-scissors while the other, outer pipe returns said fluid to the supply In such an embodiment, the rear end of the body inside which is fitted the arrangement controlling hydraulically the movable blade of the pruning scissors, is provided with a tapped recess the rear end of which is perforated axially with a bore adapted to interconnect said recess with the input of the hydraulic distributor of the pruning scissors and to house the free end of the union carried by the inner hose pipe, while the union fitted on the outer hose pipe is screwed into the tapping of said recess and bears through its free end against a rigid of disconnectable shoulder formed on the inner union which is held fast in position by the pressure exerted by the outer union screwed into the tapping.

The latter union is connected inwardly with the output of the hydraulic distributor through a passage formed in the body of the apparatus. This prior arrangement has improved substantially the execution, the handling and the operation of hydraulic pruning-scissors. However, it has been found that the rigid fitting through screwing of the ends or mouthpieces of the coaxial hose-pipes feeding and returning the fluid did not prevent the twisting of the latter during the kendling of the tool; such a twisting may jeopardize the proper flow of fluid and further damage in the hosepipes or again cause an unscrewing of their mouth pieces.

SUMMARY OF THE INVENTION

The present invention has for its object to remove this drawback through simple means whereby the coaxial hoses may be fitted easily and speedily on the machines of apparatus operated by compressed fluid and if required on the unions connected with the supply of hydraulic fluid, the disconnection of the coaxial hoses or lines being obtained speedily and conveniently with reference to such machines, apparatus or unions.

The improved system according to the invention includes a rotatable mouth-piece constituted by two coaxial hose pipe connections attached respectively to one inner, feeding hose and to the outer, return hose, the novelty of the arrangement consisting in that these connections are capable of rotating freely with reference to each other and also with reference to the body of the apparatus or union housing such a connection.

According to a further feature, the connecting means include a journal member such as a ball bearing or a journal carried by the outer hose pipe mouth-piece while a locking member is adapted to prevent any axial translational movement of the rotary mouth-piece after the latter has been inserted in the housing provided for it in the body of the device such as a machine or apparatus.

BRIEF DESCRIPTION OF THE DRAWINGS

Such objects and purposes with others will appear in the reading of the following description of the improved connecting means, reference being made to the accompanying drawings wherein.

DESCRIPTION OF PREFERRED EMBODIMENTS

Figure 1:
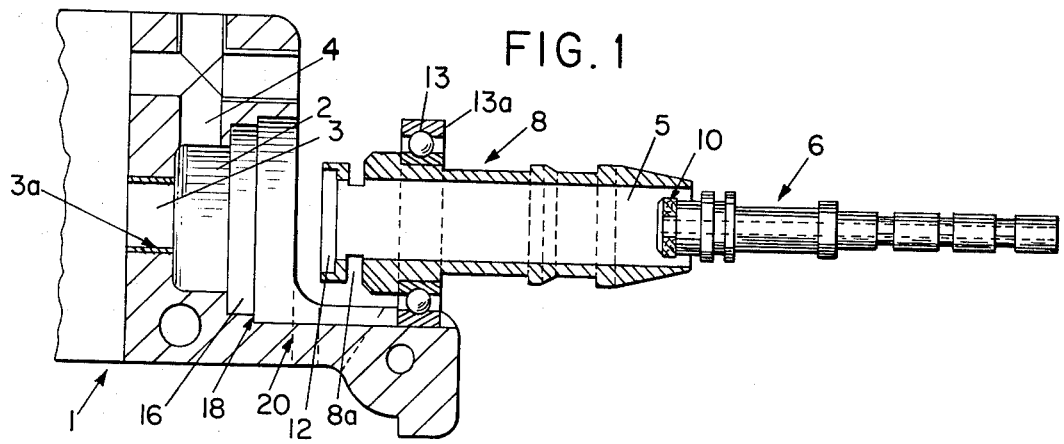
FIG. 1 is a sectional view through the axis of the arrangement, showing the different parts in a disconnected condition

Refering to the embodiment illustrated, it is intended to connect the ends of coaxial hoses respectively with the rear end of the body of a hand-tool such as hydraulic shears (FIGS. 1 to 3) and with the ends of a body in the form of a union (FIG. 4) connected in its turn with the output providing for the return towards a supply of hydraulic fluid.

Such a union or body may, for instance, be connected with the hydraulic circuit of a traction-engine or with a movable hydraulic set provided chiefly with a pump and an oil tank. However, as already stated, such embodiments are not to be construed in a limiting sense and the improved arrangement may serve also as a disconnectable fitting of coaxial hose pipes hoses feeding fluid into any device, apparatus or machine for use in a yard and returning same out of said apparatus or machine, operating hydraulically and requiring an input of oil under high pressure and an output of oil under low pressure.

The arrangement illustrated includes chiefly a body housing formed in the body of the apparatus or machine, a rotatable hose pipe rigidly connected with the rear and of each of the coaxial hoses and a removable stop or holding means, which secures said hose pipes to the body when the coupling is operative.

It should be noted that the hose pipe includes two coaxial connections fitted one inside the other and fitted respectively on the end of the inner hose through which the oil under pressure flows and on the outer hose serving for the return of oil under low pressure, said connections being independant of one another and fitted in position, so as to be capable of turning freely on the one hand with reference to one another and, on the other hand, with reference to the housings formed in the body of the hydraulic apparatus and in which said connections are located.

The housing provided inside the body 1 of the apparatus is constituted by a blind bore in said body, while a cylindrical hole or bore 3 extends axially through the bottom of said blind bore: there is fitted a sleeve 3a inside the bore or hole 3 which opens into the input of the hydraulic distributor, which is not illustrated and which controls the operation of the apparatus.

Furthermore, a bore or passageway 4 extending laterally through the body 1 connects permanently the output of the hydraulic distributor and the bore 2, said passageway opening into the latter. The rotary hose pipes provided at the end of each of the coaxial hoses form two coaxial connections which are independant with reference to each other and are separated by an annular gap 5.

Thus, the inner hose pipe 6 is rigid with the end of the inner hose 7 feeding fluid under pressure while the outer hose pipe connection 8 is rigid with the end of the outer hose 9 which ensures the return flow of the low pressure fluid.

The hose pipes, chiefly the inner hose pipe may be permanently fitted by setting it over the ends of the coaxial hoses or else these ends may be provided with a connection of a conventional type which may be reused.

An annular fluidtight frictional packing 10 is fitted over the periphery of the free end of the inner hose pipe 6 which is to engage the cylindrical hole 3.

The free end of the outer hose pipe 8 is provides inwardly with an annular groove 12 inside which may be laid an elastic ring or circlip 11 forming a bearing member for the inner connection 6 (FIG. 2), said circlip lying in contact with the flat bottom of the groove 12 when the end-piece or mouth-piece of the inner hose pipe is in its coupled position.

This allows the circlip 11 to slip along the flat surface of said bottom against which it bears without any risk of its being projected out of the groove or of being broken when the hose pipes 6 and 8 assume a relative rotary movement.

The outer hose pipe 8 is provided with radial or lateral slots or the like openings 8a lying to the rear of the annular groove 12, which slots or openings afford a permanent communication between the inside of said outer hose pipe and the passageway 4 returning the oil towards the supply.

A frictional or journal member such as the roller bearing 13 is fitted round the outer hose pipe 8 between the latter and the peripheral wall of the bore 2 when said hose pipe is fitted inside the body of the apparatus.

Figure 2:
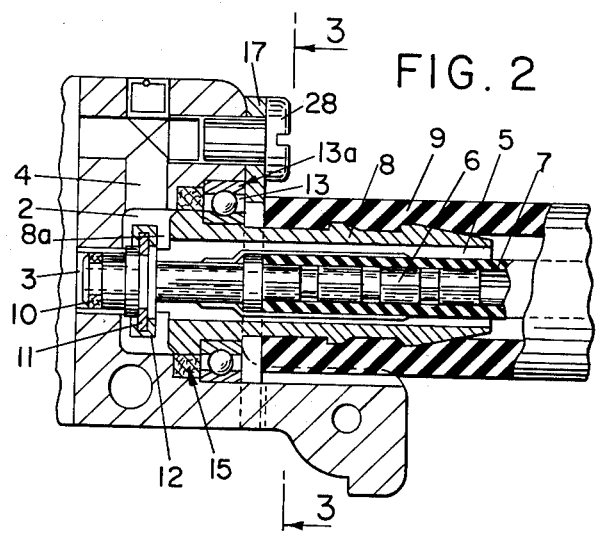
FIG. 2 is a sectional view passing through the axis and showing the parts in their operative condition.

The roller bearing 13 may be replaced by any other suitable frictional member, but a roller bearing is preferred when the rotatably assembled connections control a tool such as pruning scissors or the like (FIGS. 1 and 2). In fact, during operation, the tool may be caused many times to turn in either direction and it is therefore preferable to resort to coupling means which is as general purpose as possible.

This requirement is less imperative when the rotary connections are to be connected with an adapter 21 (FIG. 4), which latter is normally rigid with the controlled machine such as a traction-engine or a hydraulic system supplying fluid under pressure, whereby the rotary movements of the hose pipes 6 and 8 with reference to the adapter are more reduced in number. In such a case, the journal member may be a mere journal or a bronze ring 14 instead of a roller-bearing.

During the assembly of the coupling system, the free end of the inner hose pipe provided with a packing ring 10 (FIG. 2) engages the cylindrical hole are bore 3 after a four-lobed packing 15 or the like has been, previously inserted inside the bore 2 on the downstream side of the passageway 4 as a bearing for the outer hose pipe 8.

The outer hose pipe carrying the roller bearing 13 is then inserted inside the bore 2, whereby the bottom of the annular groove 12 may engage and abut against the circlip 11 while the roller bearing 13 bears laterally against the packing 15.

The rotary hose pipe or connection 8 is secured inside the body 1 of the apparatus by a holding member which prevents the rotary end-piece from receding, without preventing its rotation.

The rotary connections are preferably secured to the tools or the like hydraulically controlled apparatus by a bifurcated strap or the like member 17, held at its center held by the screw 28 on the body 1 and bearing against the rear side wall of the outer ring 13a of the roller bearing 13 carried by the outer hose pipe 8 while the front side wall of said outer ring bears against an annular shoulder 18 of the bore 2 (FIG. 1).

Figure 3:
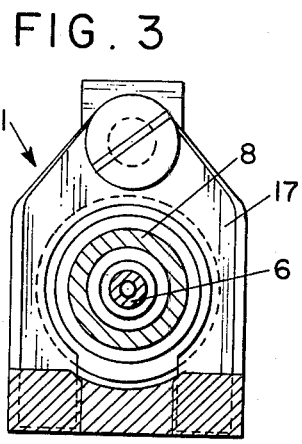
FIG. 3 is a cross-section of FIG. 2
Figure 4:
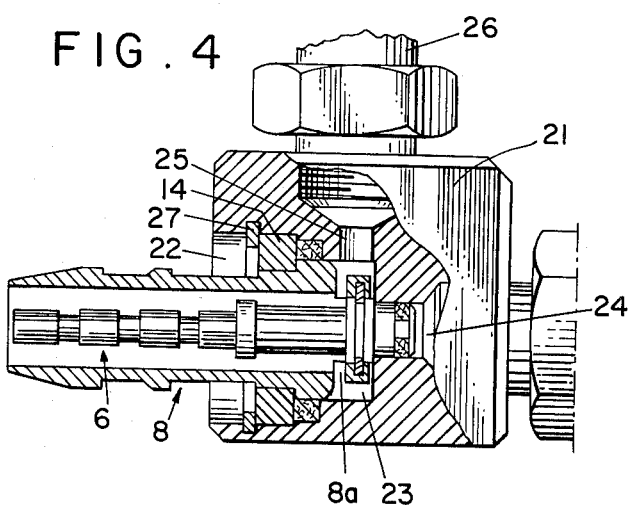
FIG. 4 is a sectional view of a modified embodiment, also passing through its axis.

In order to prevent the handling of the apparatus or the pressure of oil on the front surface of the inner connection from generating stresses leading to a folding or collapsing of the strap 17 over the point at which it is held, the free ends of the strap are housed inside parallel grooves 20 formed in the body 1, as clearly shown in FIGS. 2 and 3.

It will be readily understood that the system disclosed provides means for easily and speedily coupling and disconnecting coaxial flexible hoses with reference to the devices tools, machines and apparatus. It also allows a speedy and easy disconnection of the hoses with reference to each other when it is desired to change one of the hoses which has become inoperative.

In fact, it is sufficient to remove the split circlip 11 from the inner hose pipe in order to allow the latter to be drawn out through its opposite end.

The means coupling the opposite ends of the coaxial hose pipes respectively with the tools or the like controlled apparatus or machines are similar inasmuch as the body 21 of the union is designed in a manner similar to the body 1 of the actual apparatus. The union body 21 is, in fact, provided with a bore 22 extending beyond its bottom as a coaxial cylindrical bore 23 communicating with the channel 24 feeding oil under pressure, while a transverse port 25 connects the bore 22 with the channel 26.

Since the rotary end-piece or connection carried by the adapter is less frequently disconnected, the removable stop holding the coupling in its permanently coupled position may be constituted by a circlips 27 housed within annular grooves provided near the outer end of the bore 22.

What is claimed is:

1. A secure and easily dismountable coupling system for use with a hydraulically powered device, said device being adapted to be operated by a high pressure hydraulic fluid, said coupling system permitting the rotation of said device relative to said system, said coupling system comprising:

(a) an outer hose pipe adapted to have a hose attached thereto on one end of said outer hose pipe, and adapted to be fitted within a body associated with said device, journal means adapted to permit rotation of the entire outer hose pipe relative to said device disposed around the outside of said outer hose pipe and adapted to be positioned between said outer hose pipe and said body;

(b) an inner hose pipe adapted to have a hose attached to one end thereof, wherein said inner hose pipe is held within said outer hose pipe by means of a circlip;

(c) at least one lateral port in said outer hose pipe positioned between said one end of said inner hose pipe on which said hose is to be attached and said circlip, said port being adapted to permit fluid to pass therethrough; and (d) means for attaching said coupling system to said hydraulically powered device.

2. The coupling system as defined by claim 1 wherein said body includes a third bore adapted to receive said inner and outer hose pipes.

3. The coupling system as defined by claim 2 wherein said outer hose pipe includes an inner annular groove adapted to fully seat said circlip thereby maintaining said inner hose pipe within said outer hose pipe while permitting each of said inner and outer hose pipes to rotate relative to one another.

4. The coupling system as defined by claim 3 wherein said inner annular groove comprises a flat base and said circlip is adapted to rotate while in contact with said base.

5. The coupling system as defined by claim 3 wherein said inner hose pipe includes two annular ribs with a space therebetween, and said circlip is disposed in said space, said circlip having a greater outer diameter than each of said ribs.

6. The coupling system as defined by claim 2 wherein said journal means is disposed between said outer hose pipe and said third bore whereby said outer hose pipe is free to rotate within said third bore.

7. The coupling system as defined by claim 6 further comprising a fluid-tight packing disposed within an annular recess in said third bore.

8. The coupling as defined by claim 1 wherein said means for securing said coupling system with said hydraulically powered device comprises a holding member adapted to maintain each of said inner and outer hoses within a third bore in said body adapted to receive said inner and outer hose pipes.

9. The coupling system as defined by claim 8 wherein said holding member is a bifurcated strap retainer and said body includes transverse parallel groovesadapted to receive the bottom ends of said strap retainer, said body further including a screw to secure the median portion of said strap retainer to said body.

10. The coupling system as defined by claim 8 wherein said inner hose pipe includes a fluid-tight annular packing fitted around the free end of said inner hose pipe and said packing is adapted to be fitted within said first bore when the free end of said inner hose is inserted therein.

11. The coupling system as defined by claim 8 wherein said outer hose pipe includes a shoulder and said journal member is disposed around said outer hose pipe said journal member being adapted to be disposed between said shoulder and said holding member.

12. The coupling system as defined by claim 11 wherein said journal member is a ball bearing comprising inner and outer walls, said outer hose pipe being held by said inner wall of said ball bearing.

13. The coupling system as defined by claim 6 wherein said outer hose pipe includes a shoulder.

14. The coupling system as defined by claim 1 wherein said journal member is a ball bearing comprising an outer and inner ring.

15. The coupling system as defined by claim 1 further comprising a body comprising first and second bores adapted to be in fluid communication with said inner and outer hose pipes respectively.

16. The coupling system as defined by claim 15 wherein said body is integral with said hydraulically powered device.

17. The coupling system as defined by claim 1 wherein said outer hose pipe includes inner annular groove adapted to seat said circlip, said groove being adapted to fully seat said circlip therein.

18. The coupling system as defined by claim 17 wherein said inner hose pipe includes two spaced annular ribs near one end thereof, said circlip being positioned between said annular ribs.

19. A coupling system for use with a hydraulically powered device using a high pressure hydraulic fluid, said system comprising a first bore for feeding pressurized fluid into said device and a second bore for draining low pressure fluid from said device, said coupling system permitting rotation of said device relative to said system; said system further comprising:
  (a) a body comprising said first and second bores;
  (b) an inner hose pipe adapted to have a boss attached thereto on one end of said inner hose pipe, and further adapted to transport said pressurized fluid to said device through said first bore;
  (c) an outer hose pipe comprising at least one lateral port adapted to drain said low pressure fluid from said device through said second bore, said outer hose pipe being adapted to have a hose attached thereto;
  (d) journal means adapted to permit rotation of the entire outer hose pipe relative to said body disposed between said outer hose pipe and said body, each of said inner and outer hoses pipes being adapted to rotate independently of each other within each of said bores;
  (e) wherein said inner hose pipe is held within said outer hose pipe by means of a circlip, said at least one lateral port being positioned between said one end of said inner hose pipe on which said hose is to be attached and said circlip; and
  (f) means for attaching said coupling system to said body.

* * * * *

UNITED STATES PATENT AND TRADEMARK OFFICE
CERTIFICATE OF CORRECTION

PATENT NO. : 4,323,269
DATED : April 6, 1982
INVENTOR(S) : Roger PELLENC

It is certified that error appears in the above—identified patent and that said Letters Patent is hereby corrected as shown below:

Column 1, line 29, "of" should be --or--.
Column 2, line 33, delete "hose pipes".
Column 2, line 50, "independant" should be --independent--.
Column 2, line 59, ":" should be --;--.
Column 2, line 68, "independant" should be --independent--.
Column 3, line 13, "fluidtight" should be --fluid tight--.
Column 3, line 16, "provides" should be --provided--.
Column 3, line 57, after "pipe" insert --6,--.
Column 3, line 59, delete ",".
Column 4, line 6, delete "held".
Column 4, line 22, after "devices" insert --,--.
Column 4, line 42, "circlips" should be --circlip--.

Signed and Sealed this

Thirteenth Day of July 1982

[SEAL]

Attest:

Attesting Officer

GERALD J. MOSSINGHOFF
Commissioner of Patents and Trademarks